United States Patent
Xie et al.

(10) Patent No.: US 9,129,385 B2
(45) Date of Patent: Sep. 8, 2015

(54) IMAGE PROCESSING DEVICE, IMAGE PROCESSING METHOD AND APPARATUS FOR HIGH PRECISION DOCUMENT CORNERS EXTRACTION

(71) Applicant: FUJITSU LIMITED, Kawasaki-shi, Kanagawa (JP)

(72) Inventors: Shufu Xie, Beijing (CN); Yuan He, Beijing (CN); Jun Sun, Beijing (CN); Hao Yu, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 13/853,544

(22) Filed: Mar. 29, 2013

(65) Prior Publication Data

US 2013/0259385 A1 Oct. 3, 2013

(30) Foreign Application Priority Data

Mar. 30, 2012 (CN) .......................... 2012 1 0091193

(51) Int. Cl.
- *G06K 9/36* (2006.01)
- *G06T 7/00* (2006.01)
- *H04N 1/00* (2006.01)
- *G06K 9/32* (2006.01)

(52) U.S. Cl.
CPC ............ *G06T 7/0085* (2013.01); *G06K 9/3208* (2013.01); *G06K 9/3233* (2013.01); *G06T 7/0083* (2013.01); *H04N 1/00681* (2013.01); *G06T 2207/20148* (2013.01); *G06T 2207/20164* (2013.01)

(58) Field of Classification Search
None
See application file for complete search history.

(56) References Cited

U.S. PATENT DOCUMENTS

| | | | | |
|---|---|---|---|---|
| 6,124,950 | A | * | 9/2000 | Honda .......................... 358/474 |
| 2013/0135689 | A1 | * | 5/2013 | Shacham et al. .............. 358/464 |

* cited by examiner

*Primary Examiner* — Brian P Werner
(74) *Attorney, Agent, or Firm* — Staas & Halsey LLP

(57) ABSTRACT

The present invention provides an image processing device, an image processing method and an apparatus so as to improve at least the precision of extracting document corners in image processing performed on an image captured for a document. The image processing device includes: an extracting unit for extracting boundaries of a document in a first direction and roughly-detected document corners, where the first direction is a horizontal direction or a vertical direction of the document image; a determining unit for determining candidate page corners on the boundaries in the first direction around the roughly-detected document corners; and a selecting unit for determining document corners of the document among the candidate page corners. With the foregoing technology of the invention, more precise document corners can be extracted, a better effect of image processing can be obtained, and applications in the field of image processing are possible.

9 Claims, 12 Drawing Sheets

IMAGE PROCESSING DEVICE, IMAGE PROCESSING METHOD AND APPARATUS FOR HIGH PRECISION DOCUMENT CORNERS EXTRACTION

CROSS-REFERENCE TO RELATED APPLICATION

This application is based upon and claims the benefit of priority of the prior Chinese Patent Application No. 201210091193.7, filed on Mar. 30, 2012, the entire contents of which are incorporated herein by reference.

FIELD OF THE INVENTION

The present invention relates to the field of image processing, and in particular to an image processing device, an image processing method and an apparatus.

BACKGROUND OF THE INVENTION

A digital image generally refers to an image captured, for example, by an apparatus such as digital camera and scan, and obtained by synthesizing any non-image data, for example, with a mathematical function, etc. Typically a digital image captured by an apparatus such as digital camera and scan may be subjected to twisting, inclination or other deformation, so it is necessary to process the image using some image processing technologies so as to correct distortion or deformation thereof.

Particularly in some image processing technologies, for example, processing performed on an image captured for a document, it is typically necessary to perform some processing such as restoration and compensation dependent upon corners of the document in the captured image, and in these image processing technologies, an improved effect of image processing will be facilitated if the accuracy of the extracted document corners can be improved.

SUMMARY OF THE INVENTION

The brief summary of the invention will be given below to provide basic understanding of some aspects of the invention. However, it shall be appreciated that this summary is neither exhaustively descriptive of the invention nor intended to define essential or important parts or the scope of the invention, but is merely for the purpose of presenting some concepts of the invention in a simplified form and hereby acts as a preamble of more detailed descriptions which will be presented later.

In view of the foregoing drawback of the prior art, an object of the invention is to provide an image processing device, an image processing method and an apparatus so as to improve at least the precision of extracting document corners in an image captured for a document.

In order to attain the foregoing object, there is provided according to an aspect of the invention an image processing device comprising: an extracting unit configured to extract boundaries of a document in a first direction and roughly-detected document corners of the document in a document image captured for the document; a determining unit configured to determine candidate page corners of the document on the boundaries of the document in the first direction around the roughly-detected document corners; and a selecting unit configured to select the candidate page corners with the closest intra-page area pixel feature to a page corner pixel feature of the document among the candidate page corners as document corners of the document, wherein the first direction is a horizontal direction or a vertical direction of the document image.

According to another aspect of the invention, there is further provided an image processing method comprising: extracting boundaries of a document in a first direction and roughly-detected document corners of the document in a document image captured for the document; determining candidate page corners of the document on the boundaries of the document in the first direction around the roughly-detected document corners; and selecting the candidate page corners with the closest intra-page area pixel feature to a page corner pixel feature of the document among the candidate page corners as document corners of the document, wherein the first direction is a horizontal direction or a vertical direction of the document image.

According to still another aspect of the invention, there is further provided an apparatus including the foregoing image processing device.

According to a further aspect of the invention, there is further provided a corresponding computer readable storage medium on which computer program executable by a computing apparatus is stored, wherein the program upon being executed can cause the computing apparatus to perform the foregoing image processing method.

The foregoing image processing device and image processing method and apparatus including the image processing device according to the embodiments of the invention can extract more precise document corners in image processing performed on a document image captured for a document so as to improve the effect of image processing.

These and other advantages of the invention will become more apparent from the following detailed description of preferred embodiments of the invention with reference to the drawings.

BRIEF DESCRIPTION OF THE DRAWINGS

The invention can be better understood with reference to the detailed description given below with reference to the accompanying drawings throughout which identical or similar reference numerals are used to denote identical or similar components. The drawings together with the following detailed description are incorporated into, and form a part, of this specification and serve to further illustrate preferred embodiments of the invention and to explain the principle and advantages of the invention. In the drawings.

Figure 1A:
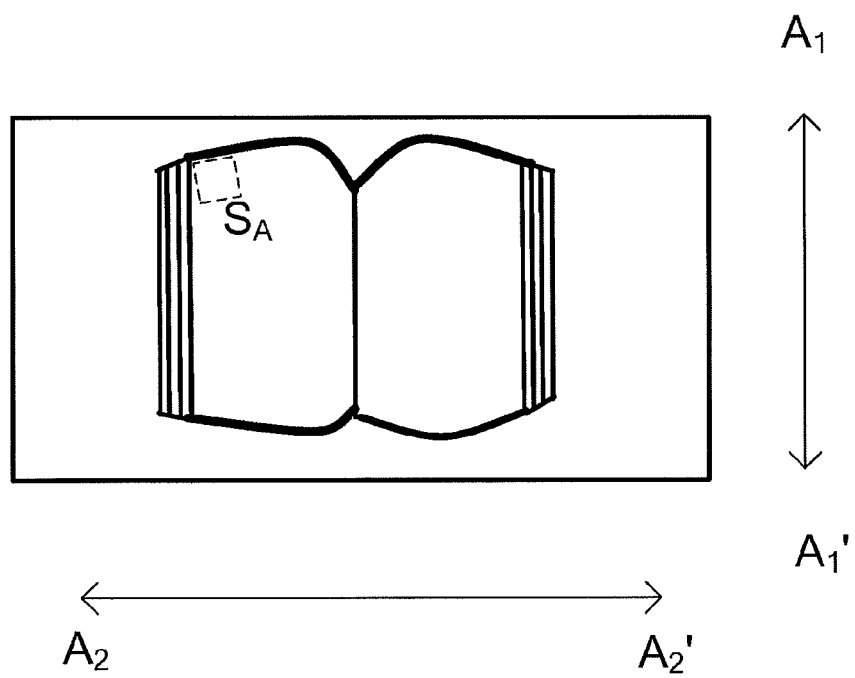
FIG. 1A is an exemplary schematic illustration showing a document image captured for a document.

Those skilled in the art shall appreciate that elements in the drawings are shown merely for the sake of simplicity and clarity but not necessarily drawn to scale. For example, some of the elements in the drawings can be oversized relative to the other elements so as to facilitate improved understanding of the embodiments of the invention.

DETAILED DESCRIPTION OF THE INVENTION

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-relevant constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the invention are illustrated in the drawings while other details less relevant to the invention are omitted so as not to obscure the invention due to those unnecessary details.

As described above, document corners extracted when a document image captured for a document is processed in some existing image processing technologies might considerably deviate from real corners of the document.

For example, FIG. 1A is a schematic illustration showing a document image captured for a document, where a document page in the document image as shown in FIG. 1A may have various contents, e.g., characters, pictures, etc., thereon (the contents are not shown in FIG. 1A).

Figure 1B:
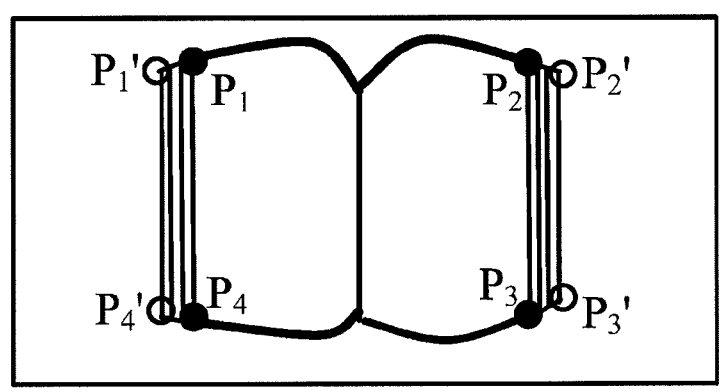
FIG. 1B is an exemplary schematic illustration showing corners detected when the document image as shown in FIG. 1A is processed in an existing image processing method and real corners of the document.

FIG. 1B is a schematic illustration showing corners $P_1'$ to $P_4'$ possibly detected when the document image as shown in FIG. 1A is processed in some existing image processing methods and real corners $P_1$ to $P_4$ of the document. As shown in FIG. 1A and FIG. 1B, since there are a number of pages included in such a document, the detected corners might considerably deviate from the real corners when the document is laid open. Moreover the detected corners might considerably deviate from the real corners due to other factors, for example, other interfering factors (e.g., background contents difficult to separate from the foreground, etc.) existing in the foregoing document image in proximity to the real corners of the document.

In view of this, in order to enable more precise document corners to be extracted from the document image extracted for the document and further improve processing effect of image processing, the invention proposes an image processing device for processing a document image captured for a document to thereby address the foregoing problem.

The image processing device includes: an extracting unit configured to extract boundaries of a document in a first direction and roughly-detected document corners of the document in a document image captured for the document; a determining unit configured to determine candidate page corners of the document on the boundaries of the document in the first direction around the roughly-detected document corners; and a selecting unit configured to select the candidate page corners with the closest intra-page area pixel feature to a page corner pixel feature of the document among the candidate page corners as document corners of the document, wherein the first direction is a horizontal direction or a vertical direction of the document image.

An image processing device according to embodiments of the invention will be described below in details with reference to FIG. 2 to FIG. 9B.

Figure 2:
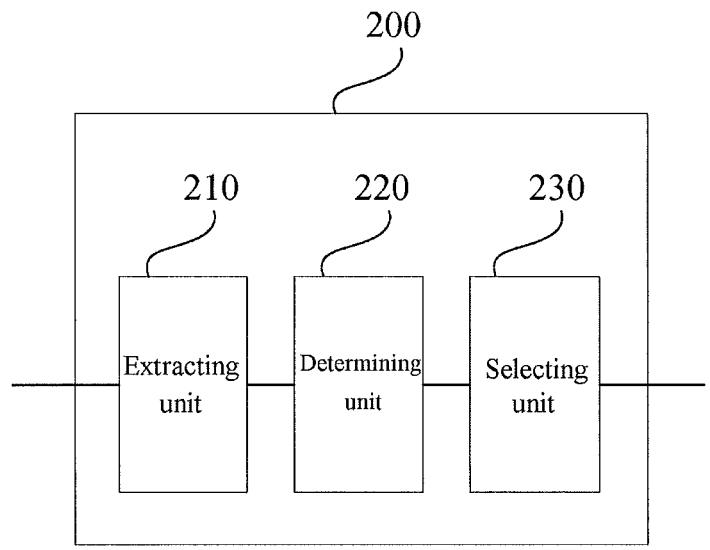
FIG. 2 is a block diagram schematically illustrating an exemplary structure of an image processing device according to an embodiment of the invention.

FIG. 2 is a block diagram schematically illustrating an exemplary structure of an image processing device 200 according to an embodiment of the invention. As shown in FIG. 2, the image processing device 200 according to the embodiment of the invention includes an extracting unit 210, a determining unit 220 and a selecting unit 230.

As shown in FIG. 2, the extracting unit 210 in the image processing device 200 is used to extract boundaries of a document in a first direction and roughly-detected document corners of the document in a document image captured for the document.

Particularly the document as referred here to can be, for example, a document such as book and magazine laid open (as shown in FIG. 1A), a document unopened but stacked in pages (not shown), or a single page document such as a single sheet of page and a single business card (not shown), etc. The image processing device 200 according to the embodiment of the invention will be described exemplarily below primarily taking the document image as shown in FIG. 1A as an example.

Here the "first direction" as referred here to can be a horizontal direction of the document image or a vertical direction of the document image.

For example, in the example shown in FIG. 1A, the document is opened with the linked left and right pages laid open so that there will be vertical outer edges of a plurality pages appearing respectively on the left and right sides of the document when the document is laid open as shown in FIG. 1A, and thus corners extracted while processing the document image may considerably deviate from real corners or a number of corners may be extracted due to interfering of a plurality of corners of pages and no selection can be made therefrom. In this case, preferably the foregoing "first direction" can be set to the longwise direction of the document image (the longwise direction may be the horizontal direction of the document image or the vertical direction of the document image) to thereby facilitate improving the accuracy of the extracted document corners.

Figure 3:
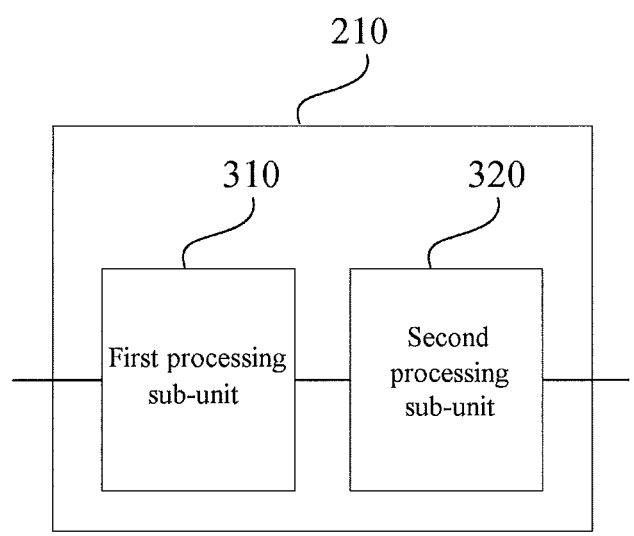
FIG. 3 is a block diagram schematically illustrating a possible exemplary structure of an extracting unit in FIG. 2.

FIG. 3 is a block diagram schematically illustrating a possible exemplary structure of the extracting unit 210 in FIG. 2. As shown in FIG. 3, the extracting unit 210 can include a first processing sub-unit 310 and a second processing sub-unit 320.

Particularly in an implementation, the first processing sub-unit 310 can be utilized to obtain the roughly-detected document corners of the document, and the second processing sub-unit 320 can be utilized to obtain the foregoing "boundaries of the document in the first direction".

Figure 4A:
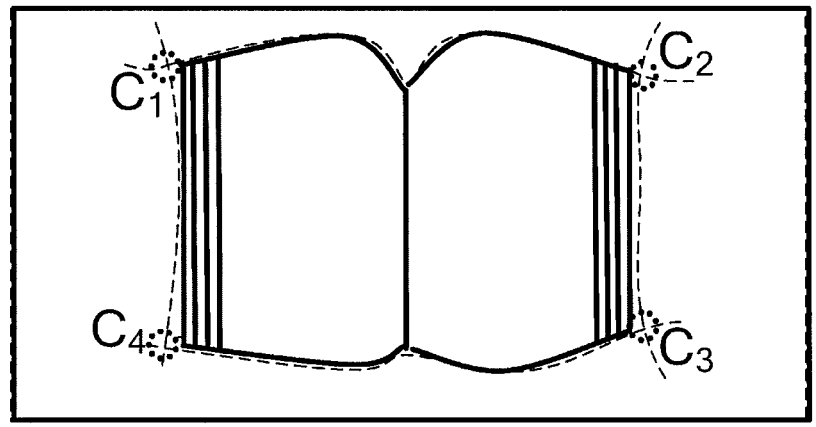
FIG. 4A is an exemplary schematic illustration showing roughly-detected document corners extracted in processing by the extracting unit as shown in FIG. 3.

For example, as shown in FIG. 4A, in this implementation, the first processing sub-unit 310 can, for example, be configured to obtain a foreground area of the foregoing document image in a global binarization method (for example, see N. Otsu, "A Threshold Selection Method from Gray-Level Histograms", IEEE Trans. Sys., Man., Cyber. vol. 9, pp. 62-66, 1979) and then extract edges of the foreground area (four edges in the example shown in FIG. 4A) and to determine intersections between the adjacent edges (points $C_1$ to $C_4$ as in FIG. 4A) as the roughly-detected document corners of the document, where dotted lines in FIG. 4A represent the four edges obtained in this example.

Figure 4B:
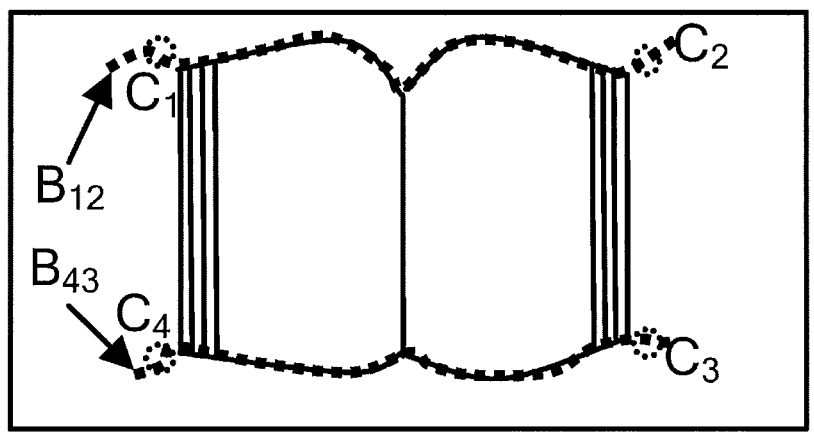
FIG. 4B is an exemplary schematic illustration showing boundaries of a document in a first direction extracted in processing by the extracting unit as shown in FIG. 3.

Moreover in this implementation, the second processing sub-unit 320 can, for example, be configured to detect boundaries between the roughly-detected document corners of the document in the first direction in a dynamic programming method as the boundaries of the document in the first direction. Specifically, as shown in FIG. 4A, for example, in the case that the "first direction" is the horizontal direction of the document image (the direction $A_2$-$A_2'$ as shown in FIG. 1A), a boundary between $C_1$ and $C_2$ (including parts of an extending line) (simply referred below to an "upper boundary of the document") and a boundary between $C_3$ and $C_4$ (including parts of an extending line) (simply referred below to a "lower boundary of the document") can be obtained in the foregoing way. For example, the "boundaries of the document in the first direction" extracted by the second processing sub-unit 320 can be the upper boundary $B_{12}$ of the document and the lower boundary $B_{43}$ of the document as shown in FIG. 4B. Moreover the roughly-detected corners of the document can alternatively be obtained otherwise.

It shall be noted here that the structure and function shown in FIG. 3 are merely a possible implementation of the extracting unit 210, but the extracting unit 210 will not be limited thereto, and instead any other structure in which the extracting unit 210 can perform its function shall fall into the claimed scope of the invention.

As shown in FIG. 2, the determining unit 220 in the image processing device 200 is used to determine candidate page corners of the foregoing document on the boundaries of the document in the first direction around the roughly-detected document corners obtained by the extracting unit 210.

Figure 5:
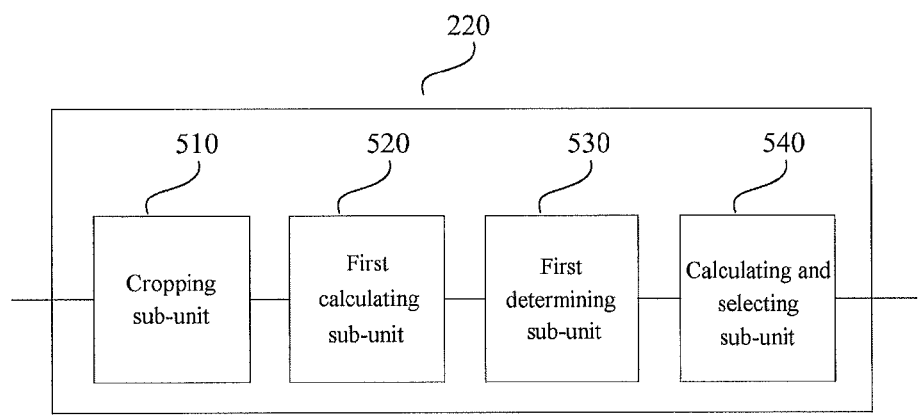
FIG. 5 is a block diagram schematically illustrating a possible exemplary structure of a determining unit in FIG. 2.

Specifically the function of the determining unit 220 can be performed in the structure as shown in FIG. 5.

FIG. 5 is a block diagram schematically illustrating a possible exemplary structure of the determining unit 220 as shown in FIG. 2. As shown in FIG. 5, the determining unit 220 can include a cropping sub-unit 510, a first calculating sub-unit 520, a first determining sub-unit 530 and a calculating and selecting sub-unit 540.

Particularly the cropping sub-unit 510 can be configured to perform for each of the roughly-detected document corners obtained by the extracting unit 210 the process of cropping a boundary segment including the roughly-detected document corner on the boundary of the document in the first direction and of cropping an image block including the boundary segment in the document image.

Figure 6A:
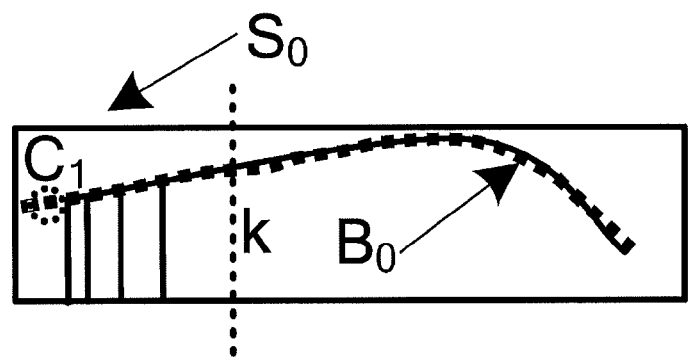
FIG. 6A is an exemplary schematic illustration showing a boundary segment and an image block including the boundary segment obtained in processing by the determining unit as shown in FIG. 5.

For example, the process of the cropping sub-unit 510 will be described taking the roughly-detected document corner $C_1$ shown in FIG. 4B as an example. As shown in FIG. 6A, for the roughly-detected document corner $C_1$, the cropping sub-unit 510 can be configured to crop a boundary segment $B_0$ on the "boundary in the first direction" corresponding to $C_1$ (for example, the upper boundary $B_{12}$ of the document shown in FIG. 6A), where $B_0$ includes the roughly-detected document corner $C_1$. Then as shown in FIG. 6A, the cropping sub-unit 510 can be configured to crop an image block $S_0$ including the boundary segment $B_0$ in the document image, for example, a rectangular area can be determined from the maximum and minimum abscissas and ordinates of all the points on the boundary segment $B_0$ as the foregoing image block; and moreover in another example, an image block in another shape can alternatively be selected as long as the image block include the foregoing boundary segment $B_0$.

After the cropping sub-unit 510 obtains the boundary segment $B_0$ and the image block $S_0$, the first calculating sub-unit 520 can be utilized to obtain a binarized gradient image of the image block $S_0$. For example, the first calculating sub-unit 520 can be configured to obtain a binarized gradient image of the image block $S_0$ by calculating a gradient of the image block $S_0$ in the first direction (i.e., a horizontal gradient or a vertical gradient) and using a threshold method.

Moreover the first calculating sub-unit 520 can be further configured to obtain the slope of a boundary of the document in a second direction in a minimum entropy method, where the "boundary in the second direction" as referred here to is a boundary intersecting with the "boundary in the first direction". For example, the second direction is the vertical direction of the document image (the direction $A_1$-$A_1'$ as shown in FIG. 1A) in the case that the first direction is the horizontal direction of the document image (the direction $A_2$-$A_2'$ as shown in FIG. 1A), and the second direction is the horizontal direction of the document image in the case that the first direction is the vertical direction of the document image. It shall be noted that the "boundary of the document in the second direction" may not necessarily be determined as long as the slope thereof is ascertained. Particularly the dotted line k in FIG. 6A shows the direction of the "slope of the boundary of the document in the second direction" calculated in this example.

Thus the first determining sub-unit 530 and the calculating and selecting sub-unit 540 can be configured as follows so as to select the candidate page corners of the roughly-detected document corner $C_1$ on the boundary segment $B_0$ cropped by the cropping sub-unit 510.

Figure 6B:
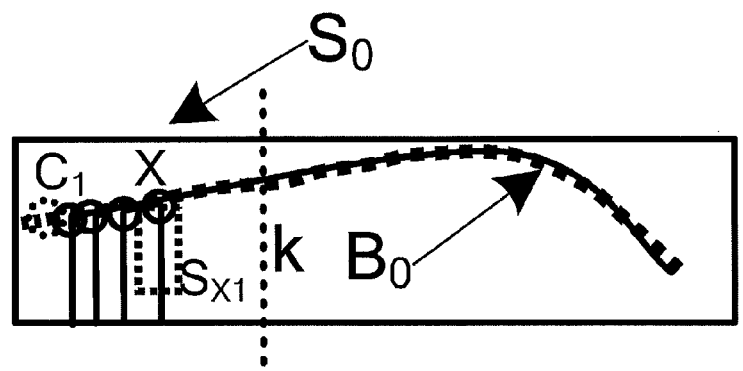
FIG. 6B and FIG. 6C are exemplary schematic illustrations showing a first rectangular area determined in processing by the determining unit as shown in FIG. 5.

For example, the first determining sub-unit 530 can be configured to determine around each point on the boundary segment $B_0$ a first rectangular area related to the point, where the first rectangular area is of a first preset size, included in the corresponding image block and of a length extending in a direction consistent with the slope of the boundary of the document in the second direction. As illustrated in FIG. 6B, taking an arbitrary point X on the boundary segment $B_0$ as an example, $S_{X1}$ represents the first rectangular area related to the point X, where the lengthwise direction of $S_{X1}$ consistent with the direction of k.

Figure 6C:
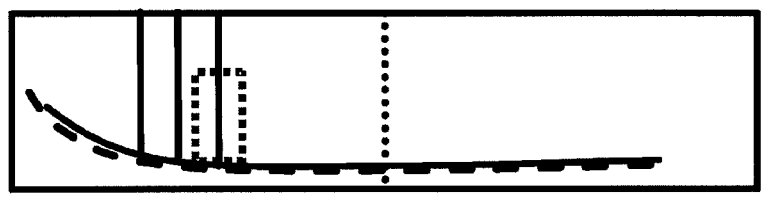

For example, in the case that the foreground area of the document image has been obtained, the foregoing first rectangular area corresponding to each point on the boundary segment can be located in the foreground area of the document image. That is, for example, in the case that the foregoing first direction is the horizontal direction of the document image, the first rectangular area corresponding to each point on the boundary segment at an upper location among the boundary segments obtained by the cropping sub-unit 510 can be located below the point (the point X and the first rectangular area $S_{X1}$ as in FIG. 6B), and the first rectangular area corresponding to each point on the boundary segment at a lower location among the boundary segments obtained by the cropping sub-unit 510 can be located above the point (as illustrated in FIG. 6C), so that it can be ensured the first rectangular area corresponding to each point on the boundary segment can be located in the foreground area of the document image.

Then the calculating and selecting sub-unit 540 can be configured to calculate the numbers of foreground pixels included in the respective first rectangular areas according to the foregoing binarized gradient image of the image block and to select points satisfying the following condition on the boundary segment corresponding to the roughly-detected document corner as the candidate page corners of the roughly-detected document corner: the numbers of foreground pixels included in the first rectangular areas corresponding to the points are above a first preset threshold. For example, as illustrated in FIG. 6B, those points with the numbers of foreground pixels included in the corresponding first rectangular areas being above the first preset threshold are selected among all the points on the boundary segment $B_0$, where the roughly-detected document corner $C_1$ is located, as the candidate page corners of the roughly-detected document corner $C_1$. The candidate page corners thus selected can be more representative of corners of each page of the document.

As described above, as illustrated in FIG. 1, the extracting unit 210 and the determining unit 220 can be configured to obtain the candidate page corners of the document. For example, a plurality of candidate page corners of each roughly-detected document corner can obtained for the document image as illustrated in FIG. 1. Thus, the selecting unit 230 can be configured to select one of the plurality of candidate page corners of each roughly-detected document corner as a document corner of the document related to the roughly-detected document corner. Particularly taking the roughly-detected document corner $C_1$ as an example, the candidate page corner with the closest intra-page area pixel feature to a page corner pixel feature of the document can be selected among all the candidate page corners of the roughly-detected document corner $C_1$ as a document corner of the document.

Particularly the intra-page area pixel feature of the candidate page corner refers to a pixel feature, belonging to an area inside the document (simply referred below to as an "intra-page area") in proximity to the candidate page corner, for example, the number of foreground pixels contained in the intra-page area of the candidate corner or the percentage of the number of the foreground pixels to the intra-page area, etc. The page corner pixel feature of the document refers to a pixel features included in a page corner area of the document (for example, the area $S_A$ illustrated in FIG. 1A), where the page corner pixel feature of the document can be obtained in advance or be set empirically. A general document is commonly set with a page margin of a specific width (that is, a blank areas around a page), so the page corner area of the document tends to contain almost no foreground pixel (excluding special cases). Thus in this case, the "closest . . . to a page corner pixel feature of the document" also indicate that approximately no foreground pixel is contained, so for the respective candidate corners, the smaller the numbers of foreground pixels included in the corresponding intra-page areas of the same size, the closer they will be to real corners of the document.

Figure 7A:
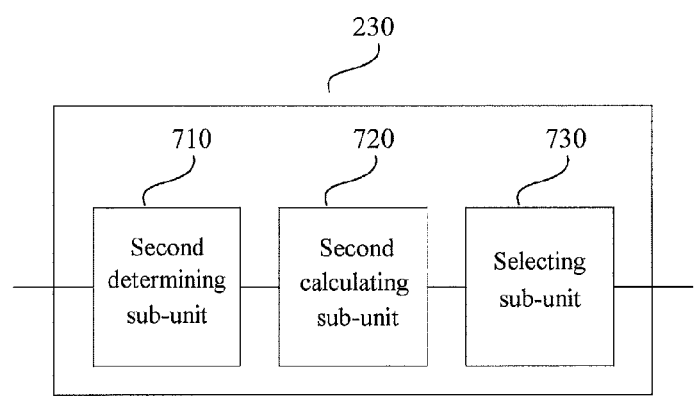
FIG. 7A is a block diagram schematically illustrating a possible exemplary structure of a selecting unit in FIG. 2.

For example, in an implementation, the function and the operation of the selecting unit 230 can be performed in the structure as illustrated in FIG. 7A. As illustrated in FIG. 7A, the selecting unit 230 can include a second determining sub-unit 710, a second calculating sub-unit 720 and a selecting sub-unit 730.

Figure 8A:
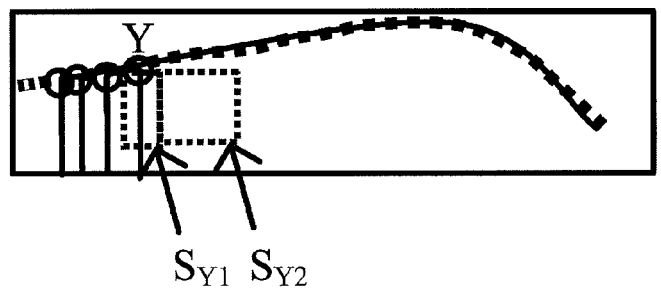
FIG. 8A and FIG. 8B are exemplary schematic illustrations showing an intra-page area determined in processing by the selecting unit as shown in FIG. 7.

Particularly the second determining sub-unit 710 can be configured, for each roughly-detected document corner, to determine around each candidate page corner of the roughly-detected document corner an intra-page area related to the candidate page corner, where the intra-page area is of a second preset size and included in the corresponding image block. As illustrated in FIG. 8A, for a candidate corner Y, an intra-page area thereof towards the inside of a page can, for example, be the area $S_{Y2}$, where the intra-page area $S_{Y2}$ of the candidate corner Y is closer to the inside of the document, that is, closer to the center of the document image, than the first rectangular area $S_{Y1}$ of the candidate corner Y.

Particularly the intra-page area will not be limited to the rectangular or square area illustrated in FIG. 8A but can be an area of a round or in other shapes.

For example, in an implementation, the intra-page area can be a rectangular or square area with the candidate page corner corresponding to the intra-page area being a vertex, and an edge of the intra-page area extends in a direction consistent with the slope of the foregoing boundary in the second direction. Then in this implementation, for example, with the foregoing setting, the intra-page area corresponding to each candidate page corner of those roughly-detected document corners located on the upper left of the document is located on the lower right thereof (as illustrated in FIG. 8A), the intra-page area corresponding to each candidate page corner of those roughly-detected document corners located on the lower left of the document is located on the upper right thereof (not illustrated), the intra-page area corresponding to each candidate page corner of those roughly-detected document corners located on the upper right of the document is located on the lower left thereof (as illustrated in FIG. 8B), and the intra-page area corresponding to each candidate page corner of those roughly-detected document corners located on the lower right of the document is located on the upper left thereof (not illustrated).

Figure 8B:
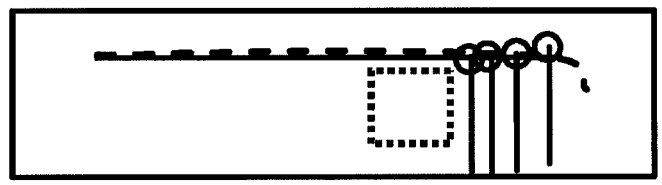

Particularly the foregoing cases not illustrated can be readily derived from FIG. 8A and FIG. 8B.

Then the second calculating sub-unit 720 can be configured to calculate the percent of foreground pixels in the intra-page area corresponding to each candidate page corner of each roughly-detected document corner, where the percent of foreground pixels in the intra-page area corresponding to a candidate page corner is the proportion of the number of foreground pixels in the intra-page area corresponding to the candidate page corner to the intra-page area.

Next the selecting sub-unit 730 can be configured to select, the candidate page corner with the closest percent of foreground pixels in the corresponding intra-page area to the percent of foreground pixels in a page corner area of the document, among the candidate page corners of each roughly-detected document corner, as a document corner of the document. Generally the percent of foreground pixels in a page corner area of a document can be considered to be close to 0 due to setting of a page margin, so in an implementation, the percent of foreground pixels in the page corner area of the document can be considered to be 0. Thus the candidate page corner with the closest percent of foreground pixels in the intra-page area to 0, that is, the candidate page corner with the lowest percent of foreground pixels in the intra-page area (in the case of being above 0), can be selected among all the candidate page corners of a roughly-detected document corner as a finally determined document corner.

It shall be noted that in some special cases, for example, the document is a color-printed magazine or a cover page, etc., almost no page margin may be included therein, and in these case, a page corer pixel feature of such a document (for example, a color feature, a shape feature and/or a pixel distribution feature, etc.) can be obtained in advance, and then the same type of pixel feature of the intra-page areas of the candidate page corners can be calculated and compared therewith, and the candidate page corner with the closest feature therebetween can be selected as a document corner of the document.

Figure 7B:
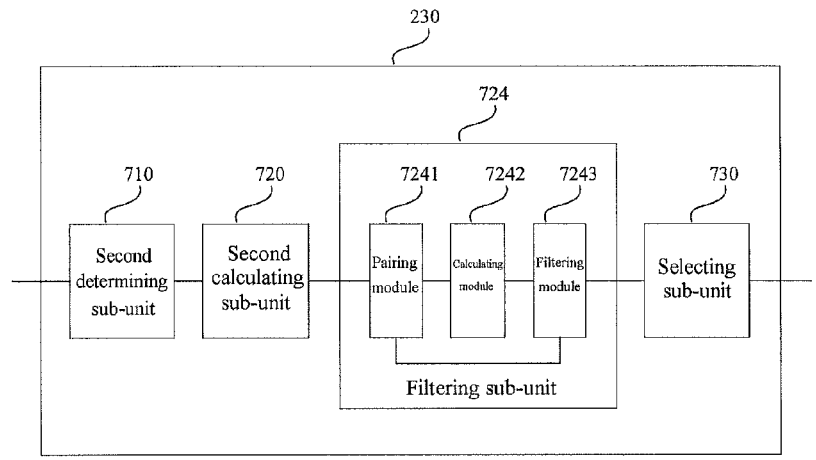
FIG. 7B is a block diagram schematically illustrating another possible exemplary structure of the selecting unit in FIG. 2.

Moreover in another implementation, the function and the operation of the selecting unit 230 can be performed in the structure as illustrated in FIG. 7B. As illustrated in FIG. 7B, the selecting unit 230 can include a second determining sub-unit 710, a second calculating sub-unit 720, a filtering sub-unit 724 and a selecting sub-unit 730, where in this implementation, the second determining sub-unit 710 and the second calculating sub-unit 720 as illustrated in FIG. 7B can have the same structures and functions as and can achieve similar technical effects to the second determining sub-unit 710 and the second calculating sub-unit 720 as illustrated in FIG. 7A, and a description thereof will be omitted here.

Thus the second determining sub-unit 710 and the second calculating sub-unit 720 as illustrated in FIG. 7B can also be configured to determine intra-page areas of the candidate page corners and to calculate the percents of foreground pixels in the respective intra-page areas.

Figure 9A:
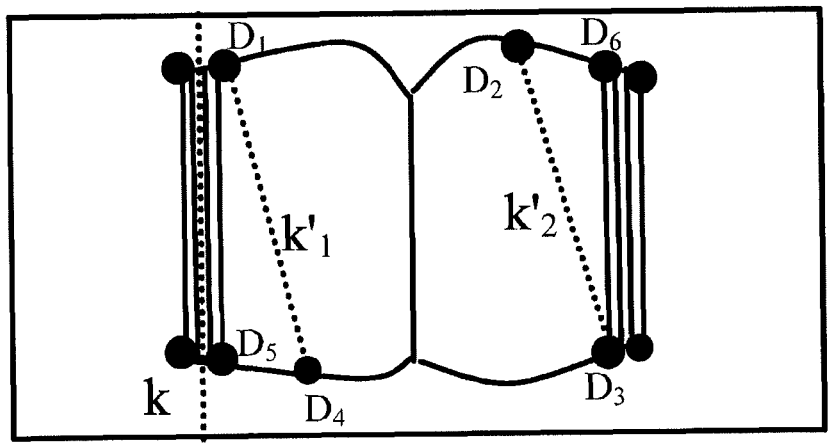
FIG. 9A is an exemplary schematic illustration showing unfiltered candidate page corners obtained in processing by the selecting unit as shown in FIG. 7B.

Unlike the example illustrated in FIG. 7A, in the example illustrated in FIG. 7B, the filtering sub-unit 724 can be utilized to filter the candidate corners. For example, the filtering sub-unit 724 including a pairing module 7241, a calculating module 7242 and a filtering module 7243 can be configured to perform the foregoing filtering function, where FIG. 9A is a exemplary schematic illustration showing the unfiltered candidate page corners obtained in processing by the selecting unit as illustrated in FIG. 7B. It shall be noted that since the contents of a real document page may include for example an inset, a crease or other contents, the page of the document image captured through scanning or otherwise may include a strip or the like, so that the candidate page corners obtained in the foregoing process may include such candidate page corners as $D_2$ and $D_4$ considerably deviating in location from the real corners, so it is necessary to filter out such candidate page corners as $D_2$ and $D_4$.

In this implementation, the pairing module 7241 can be utilized to pair every two of the candidate corners as follows:

To obtain a plurality of first pairs of candidate corners by pairing between the candidate page corners of the roughly-detected document corners distributed on the upper left of and the candidate page corners of the roughly-detected document corners distributed on the lower left of all the roughly-detected document corners, and to obtain a plurality of second pairs of candidate corners by pairing between the candidate page corners of the roughly-detected document corners distributed on the upper right of and the candidate page corners of the roughly-detected document corners distributed on the lower right of all the roughly-detected document corners, in the case that the first direction is the horizontal direction of the document image, and To obtain a plurality of third pairs of candidate corners by pairing between the candidate page corners of the roughly-detected document corners distributed on the upper left of and the candidate page corners of the roughly-detected document corners distributed on the upper right of all the roughly-detected document corners, and to obtain a plurality of fourth pairs of candidate corners by pairing between the candidate page corners of the roughly-detected document corners distributed on the lower left of and the candidate page corners of the roughly-detected document corners distributed on the lower right of all the roughly-detected document corners, in the case that the first direction is the vertical direction of the document image.

Particularly those skilled in the art can, for example, determine from the coordinates of the roughly-detected document corners the "roughly-detected document corners distributed on the upper left of all the roughly-detected document corners" and the roughly-detected document corners on the remaining locations. It shall be noted that the plurality of pairs of candidate page corners may include duplicated candidate corners, and each pair of candidate page corners will be processed below. For example, as illustrated in FIG. 9A, the obtained plurality of pairs of candidate page corners can include $(D_1, D_4)$ and $(D_1, D_5)$ in a first part, $(D_2, D_3)$ and $(D_6, D_3)$ in a second part, etc., Then the calculating module 7242 can be utilized to calculate respectively the slope of a connecting line between the two candidate page corners included in each pair of candidate page corners among the foregoing plurality of first and second pairs of candidate page corners in the case that the first direction is the horizontal direction of the document image and to calculate respectively the slope of a connecting line between the two candidate page corners included in each pair of candidate page corners among the foregoing plurality of third and fourth pairs of candidate page corners in the case that the first direction is the vertical direction of the document image, for example, the slope $k'_1$ corresponding to $(D_1, D_4)$, the slope $k'_2$ corresponding to $(D_2, D_3)$, etc., as illustrated in FIG. 9A.

Then the foregoing respective calculated slopes are compared with the slope of the boundary of the document in the second direction.

Then the filtering module 7243 can be utilized to filter out those pairs of candidate page corners with the differences between the slopes, for example, $k'_1$, $k'_2$, etc., and the slope $k$ of the boundary of the document in the second direction being above a second preset threshold and to provide the selecting sub-unit 730 with the remaining pairs of candidate page corners for processing.

In this implementation, the selecting sub-unit 730 can be configured to firstly calculate the sum of the percents of foreground pixels in intra-page areas corresponding respectively to the two candidate page corners included in each pair of candidate page corners among the filtered first and second pairs of candidate page corners or third and fourth pairs of candidate page corners. For example, for the candidate page corner $D_1$ and the candidate page corner $D_5$ in the pair of candidate page corners $(D_1, D_5)$ illustrated in FIG. 9B, the sum of both the percent of foreground pixels in the intra-page area corresponding to the candidate page corner $D_1$ and the percent of foreground pixels in the intra-page area corresponding to the candidate page corner $D_5$ is calculated.

Then the selecting sub-unit 730 can be configured to finally determine document corners of the document as follows:

To select such a pair of candidate page corners among the foregoing plurality of first pairs of candidate page corners: the sum of the percents of foreground pixels in the intra-page areas corresponding respectively to the two candidate page corners included in the pair of candidate page corners is the closest to the percent of foreground pixels in a page corner area of the document, and select such a pair of candidate page corners among the foregoing plurality of second pairs of candidate page corners: the sum of the percents of foreground pixels in the intra-page areas corresponding respectively to the two candidate page corners included in the pair of candidate page corners is closest to the percent of foreground pixels in the page corner area of the document in the case that the first direction is the horizontal direction of the document image, and to determine the candidate page corners in the pairs of candidate page corners selected respectively among the first pairs of candidate page corners and among the second pairs of candidate page corners as document corners of the document, and To select such a pair of candidate page corners among the foregoing plurality of third pairs of candidate page corners: the sum of the percents of foreground pixels in the intra-page areas corresponding respectively to the two candidate page corners included in the pair of candidate page corners is the closest to the percent of foreground pixels in a page corner area of the document, and select such a pair of candidate page corners among the foregoing plurality of fourth pairs of candidate page corners: the sum of the percents of foreground pixels in the intra-page areas corresponding respectively to the two candidate page corners included in the pair of candidate page corners is closest to the percent of foreground pixels in the page corner area of the document in the case that the first direction is the vertical direction of the document image, and to determine the candidate page corners in the pairs of candidate page corners selected respectively among the third pairs of candidate page corners and among the fourth pairs of candidate page corners as document corners of the document.

Figure 9B:
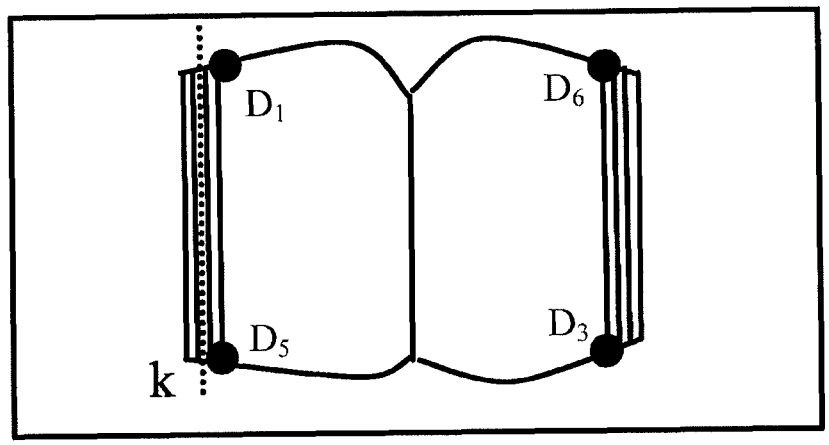
FIG. 9B is an exemplary schematic illustration showing document corners obtained finally by the selecting unit as shown in FIG. 7B.

Typically since the percent of foreground pixels in the page corner area of the document is close to 0, for example, the pair of candidate page corners with the smallest sum of the percents of foreground pixels in the intra-page areas corresponding respectively to the two candidate page corners therein can be selected, and the two candidate page corners in the pair of candidate page corners can be determined as document corners of the document. As illustrated in FIG. 9B, for example, the sum of the percents of foreground pixels in the intra-page areas corresponding respectively to $D_1$ and $D_5$ is the smallest in the first part, and the sum of the percents of foreground pixels in the intra-page areas corresponding respectively to $D_3$ and $D_6$ is the smallest in the second part, so the finally determined document corners of the document are $D_1$, $D_3$, $D_6$ and $D_5$.

As can be apparent from the foregoing description, the image processing device according to the embodiments of the invention can be applied to extract more precise document corners in image processing performed on a document image captured for a document so as to improve an effect of image processing.

Moreover embodiments of the invention further provide an image processing method. An exemplary process of the method will be described with reference to FIG. 10 to FIG. 14.

Figure 10:
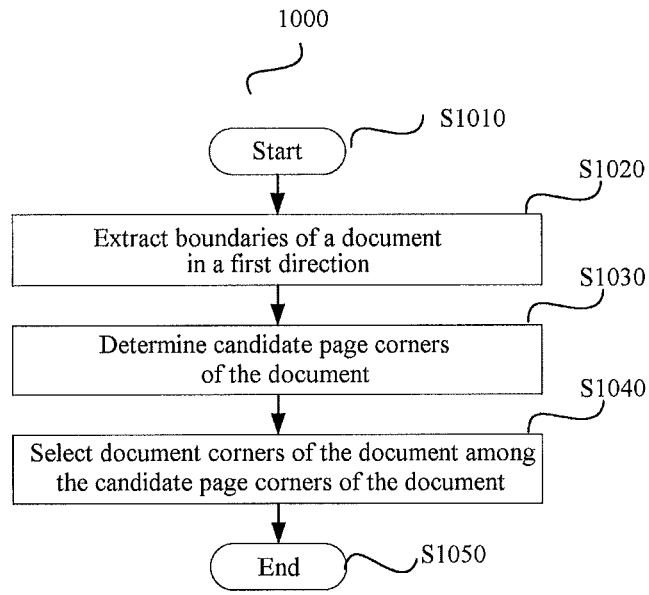
FIG. 10 is a flow chart schematically illustrating an exemplary process of an image processing method according to an embodiment of the invention.

FIG. 10 is a flow chart schematically illustrating an exemplary process of an image processing method according to embodiments of the invention.

As illustrated in FIG. 10, a process flow 600 of the image processing method according to an embodiment of the invention starts at the step S1010 and then proceeds to the step S1020.

The step S1020 is to extract boundaries of a document in a first direction and roughly-detected document corners of the document in a document image captured for the document, where the first direction can be a horizontal direction of the document image and can also be a vertical direction of the document image. Then the flow proceeds to the step S1030.

Figure 11:
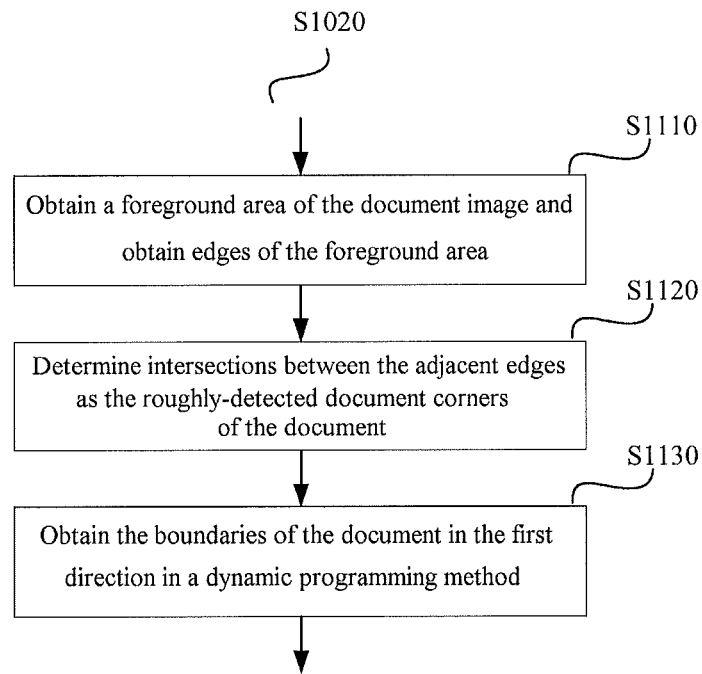
FIG. 11 is a flow chart schematically illustrating a possible exemplary process of the step S1020 as shown in FIG. 10.

Particularly the process of the step S1020 as illustrated in FIG. 10 can be performed in the steps S1110 to S1130 as illustrated in FIG. 11.

FIG. 11 is a flow chart schematically illustrating a possible exemplary process of the step S1020 as illustrated in FIG. 10. As illustrated in FIG. 11, the step S1110 is to obtain a foreground area of the document image in a global binarization method to obtain edges of the foreground area. Then the flow proceeds to the step S1120.

The step S1120 is to determine intersections between the adjacent edges of the foregoing foreground area as the roughly-detected document corners of the document. Then the flow proceeds to the step S1130.

The step S1130 is to detect boundaries between the roughly-detected document corners of the document in the foregoing first direction in a dynamic programming method as the foregoing "boundaries of the document in the first direction".

Thus the boundaries of the document in the first direction and the roughly-detected document corners of the document can be extracted in the step S1110 to S1130.

As illustrated in FIG. 10, the step 1030 is to determine candidate page corners of the document on the boundaries of the document in the first direction around the roughly-detected document corners. Then the flow proceeds to the step S1040.

Figure 12:
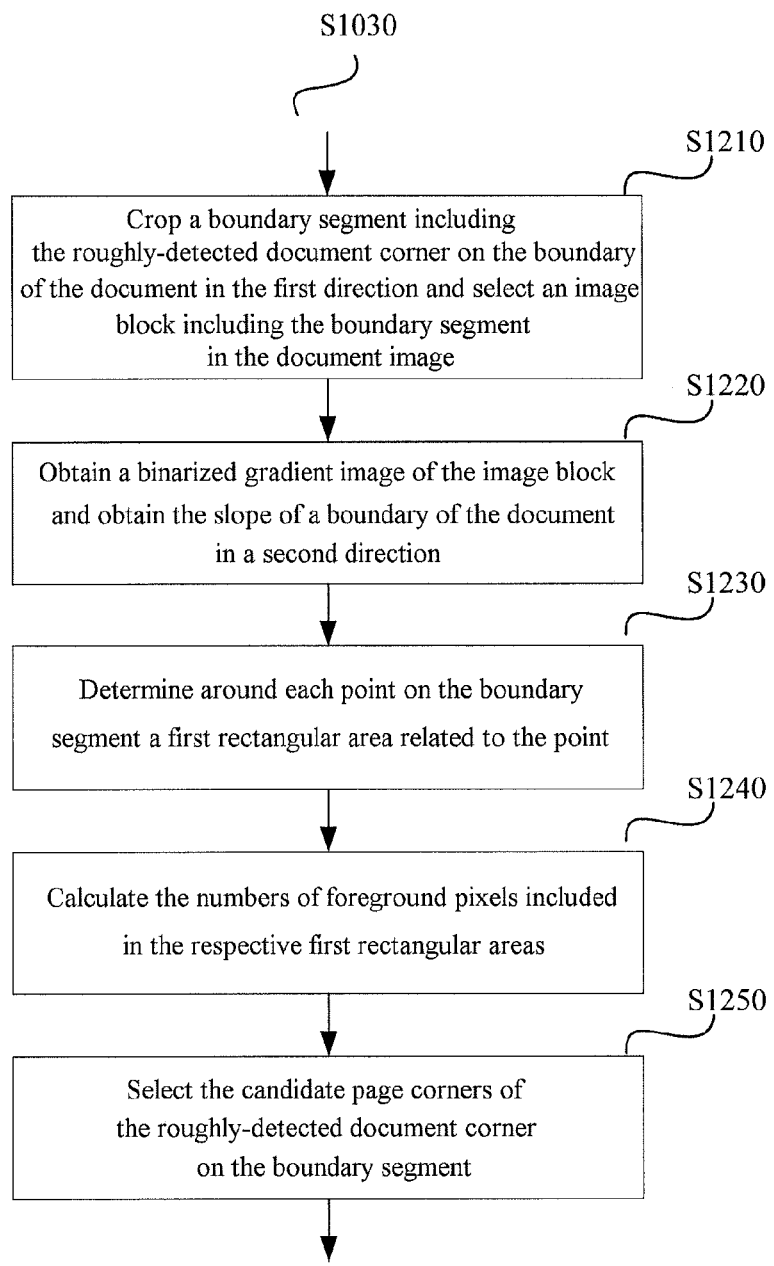
FIG. 12 is a flow chart schematically illustrating a possible exemplary process of the step S1030 as shown in FIG. 10.

Particularly the process of the step S1030 as illustrated in FIG. 10 can be performed in the steps S1210 to S1250 as illustrated in FIG. 12 performed for each roughly-detected document corner.

FIG. 12 is a flow chart schematically illustrating a possible exemplary process of the step S1030 as illustrated in FIG. 10. A process on a roughly-detected document corner will be described below with reference to FIG. 12.

As illustrated in FIG. 12, the step S1210 is to crop a boundary segment including the roughly-detected document corner on the extracted boundary of the document in the first direction and to select an image block including the boundary segment corresponding to the roughly-detected document corner in the document image. Then the flow proceeds to the step S1220.

The step S1220 is to obtain a binarized gradient image of the image block corresponding to the roughly-detected document corner by calculating a gradient of the image block in the first direction and using a threshold method and to obtain the slope of a boundary of the document in a second direction in a minimum entropy method, where the second direction is the vertical direction of the document image in the case that the first direction is the horizontal direction of the document image, and the second direction is the horizontal direction of the document image in the case that the first direction is the vertical direction of the document image. Then the flow proceeds to the step S1230.

The step S1230 is to determine around each point on the boundary segment including the roughly-detected document corner a first rectangular area related to the point, where the first rectangular area is of a first preset size, included in the corresponding image block and of a length extending in a direction consistent with the slope of the boundary of the document in the second direction. Then the flow proceeds to the step S1240. Particularly, in the case that the foreground area of the document image has been obtained, the first rectangular area corresponding to each point on the boundary segment can be located in the foreground area of the document image The step S1240 is to calculate the numbers of foreground pixels included in the respective first rectangular areas according to the foregoing binarized gradient image of the image block. Then the flow proceeds to the step S1250.

The step S1250 is to select points satisfying the following condition on the foregoing boundary segment as the candidate page corners of the roughly-detected document corner (that is, the candidate page corners of the document): the numbers of foreground pixels included in the first rectangular areas corresponding to the points are above a first preset threshold.

Thus the candidate page corners of the document can be obtained in the step S1210 to S1250.

As illustrated in FIG. 10, the step S1040 is to select the candidate page corners with the closest intra-page area pixel feature to a page corner pixel feature of the document among the candidate page corners as document corners of the document. Then the flow proceeds to the step S1050.

Figure 13:
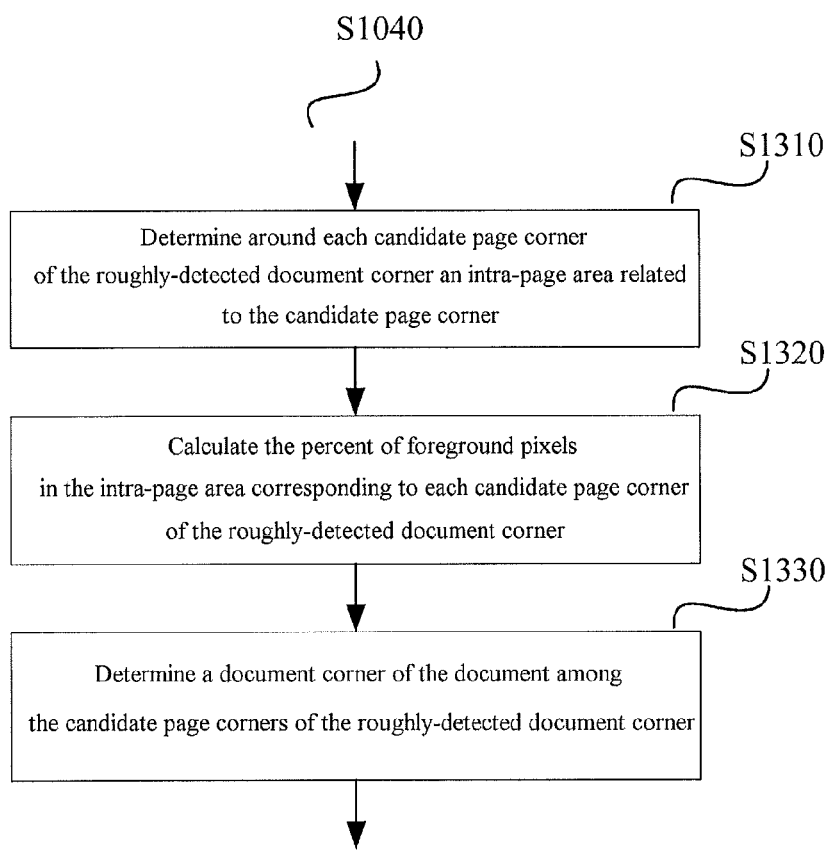
FIG. 13 is a flow chart schematically illustrating a possible exemplary process of the step S1040 as shown in FIG. 10.

Particularly the process of the step S1040 as illustrated in FIG. 10 can be performed in the steps S1310 to S1330 as illustrated in FIG. 13.

FIG. 13 is a flow chart schematically illustrating a possible exemplary process of the step S1040 as illustrated in FIG. 10. As illustrated in FIG. 13, for each roughly-detected document corner, the step S310 is to determine around each candidate page corner of the roughly-detected document corner an intra-page area related to the candidate page corner, where the intra-page area is of a second preset size and included in the corresponding image block, and the intra-page area corresponding to each candidate page corner is closer to the center of the document image than the first rectangular area corresponding to the candidate page corner. Then the flow proceeds to the step S1320.

For each roughly-detected document corner, the step S1320 is to calculate the percent of foreground pixels in the intra-page area corresponding to each candidate page corner of the roughly-detected document corner. Then the flow proceeds to the step S1330.

The step S1330 is to determine, the candidate page corner with the closest percent of foreground pixels in the corresponding intra-page area to the percent of foreground pixels in a page corner area of the document, among the candidate page corners of each roughly-detected document corner, as a document corner of the document.

Figure 14:
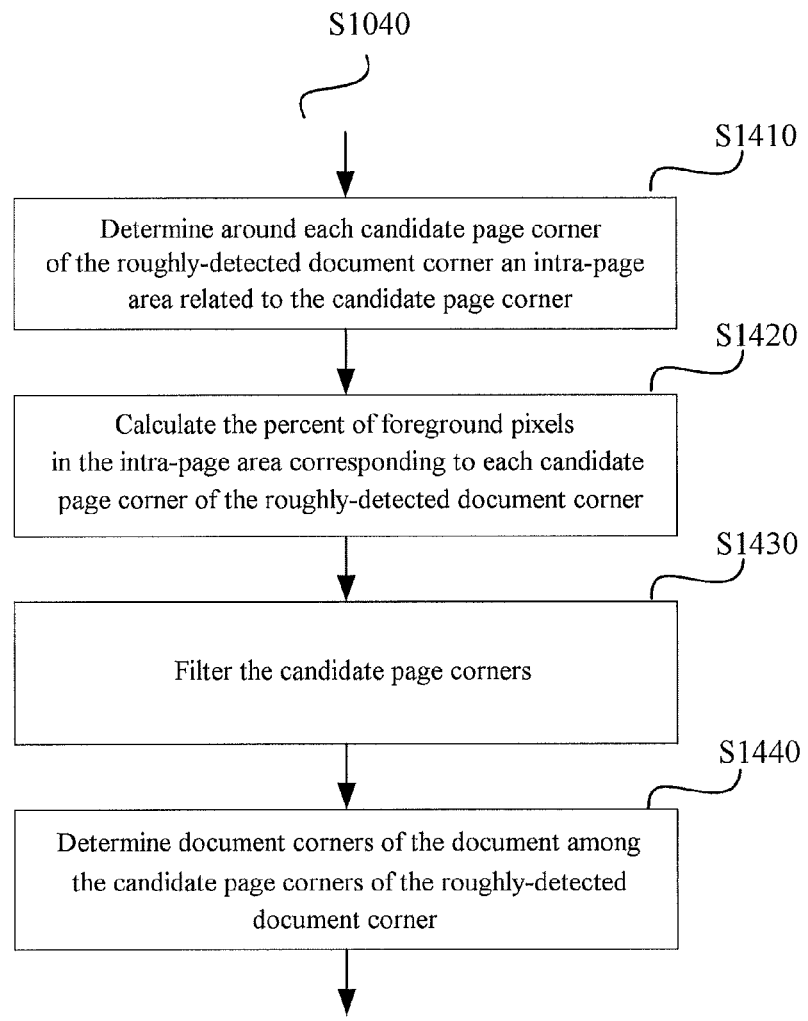
FIG. 14 is a flow chart schematically illustrating another possible exemplary process of the step S1040 as shown in FIG. 10.

Moreover the process of the step S1040 as illustrated in FIG. 10 can be performed in the steps S1410 to S1440 as illustrated in FIG. 14.

FIG. 14 is a flow chart schematically illustrating another possible exemplary process of the step S1040 as illustrated in FIG. 10. As illustrated in FIG. 14, the processes of the steps S1410 and S1420 are the same as and can achieve similar effects to the processes of the steps S1310 and S1320 as illustrated in FIG. 13, and a description thereof will be omitted here.

As illustrated in FIG. 14, the flow proceeds to the step S1430 after the steps S1410 and S1420 are performed.

The step S1430 is to filter the candidate corners. Then the flow proceeds to the step S1440.

For example in the step S1430, the candidate corners can be filtered by: obtaining a plurality of first pairs of candidate corners by pairing between the candidate page corners of the roughly-detected document corners on the upper left and the candidate page corners of the roughly-detected document corners on the lower left among the roughly-detected document corners, and obtaining a plurality of second pairs of candidate corners by pairing between the candidate page corners of the roughly-detected document corners on the upper right and the candidate page corners of the roughly-detected document corners on the lower right among the roughly-detected document corners, in the case that the first direction is the horizontal direction of the document image, and obtaining a plurality of third pairs of candidate corners by pairing between the candidate page corners of the roughly-detected document corners on the upper left and the candidate page corners of the roughly-detected document corners on the upper right among the roughly-detected document corners, and obtaining a plurality of fourth pairs of candidate corners by pairing between the candidate page corners of the roughly-detected document corners on the lower left and the candidate page corners of the roughly-detected document corners on the lower right among the roughly-detected document corners, in the case that the first direction is the vertical direction of the document image; calculating the slope of a connecting line between the two candidate page corners included in each pair of candidate page corners among the plurality of first and second pairs of candidate page corners or the plurality of third and fourth pairs of candidate page corners; and filtering out those pairs of candidate page corners with the differences between the corresponding slopes and the slope of the boundary of the document in the second direction being above a second preset threshold among the plurality of first and second pairs of candidate page corners or the plurality of third and fourth pairs of candidate page corners and obtaining the filtered pairs of candidate page corners. Thus the candidate page corners can be filtered.

Particularly the foregoing intra-page area can be a rectangular or square area with the candidate page corner corresponding to the intra-page area being a vertex, and an edge of the intra-page area extends in a direction consistent with the slope of the foregoing boundary in the second direction.

The step S1440 is to calculate the sum of the percents of foreground pixels in intra-page areas corresponding respectively to the two candidate page corners included in each pair of candidate page corners among the pairs of candidate page corners filtered in the step S1430.

Particularly this step is to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of first pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of second pairs of candidate page corners in the case that the first direction is the horizontal direction of the document image, and to determine the candidate page corners in the pairs of candidate page corners selected respectively among the first pairs of candidate page corners and among the second pairs of candidate page corners as document corners of the document.

This step is to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of third pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of fourth pairs of candidate page corners in the case that the first direction is the vertical direction of the document image, and to determine the candidate page corners in the pairs of candidate page corners selected respectively among the third pairs of candidate page corners and among the fourth pairs of candidate page corners as document corners of the document.

Thus the document corners of the document can be finally determined in either the processes of the step S1310 to S1330 or the processes of the steps S1410 to S1440.

As illustrated in FIG. 10, the process flow 1000 ends at the step S1050.

It shall be noted that the processes or sub-processes of the respective steps in the foregoing image processing method according to the embodiments of the invention can include processes in which the operations or functions of the units, sub-units, modules or sub-modules of the image processing device as described above can be performed and can achieve similar technical effects to thereof, and a description of the processes or sub-processes will be omitted here.

As can be apparent from the foregoing description, the image processing method according to the embodiments of the invention can be applied to extract more precise document corners in image processing performed on a document image captured for a document so as to improve an effect of image processing.

Moreover an embodiment of the invention further provides an apparatus including the foregoing image processing device, where the apparatus can be, for example, a document correction apparatus, a scanner, a camera, a video camera, a mobile phone, a computer, a personal digital assistant, etc.

As can be apparent from the foregoing description, the foregoing apparatus according to the embodiment of the invention can be applied to extract more precise document corners in image processing performed on a document image captured for a document so as to improve an effect of image processing.

The respective constituting units, sub-units, etc., in the foregoing image processing device according to the embodiments of the invention can be configured in software, firmware, hardware or any combination thereof. In the case of being embodied in software or firmware, program constituting the software or firmware can be installed from a storage medium or a network to a machine with a dedicated hardware structure (e.g., a general-purpose machine 1500 illustrated in FIG. 15) which can perform the various functions of the foregoing respective constituting units, sub-units, etc., when various pieces of programs are installed thereon.

Figure 15:
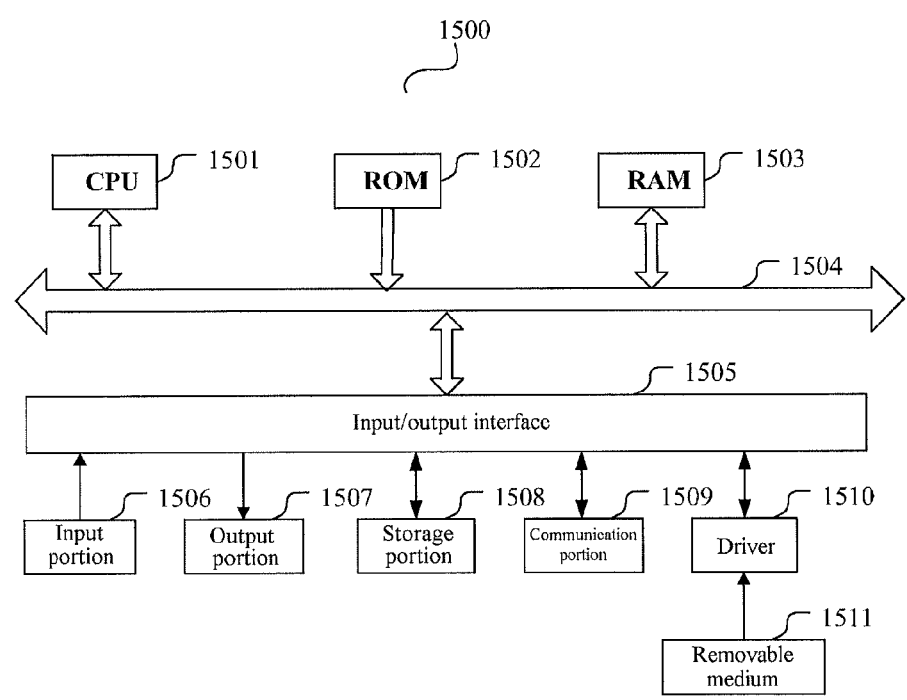
FIG. 15 is a simplified structural diagram showing a hardware configuration of a possible information processing apparatus in which the image processing device and the image processing method according to the embodiments of the invention can be embodied.

FIG. 15 is a simplified structural diagram showing a hardware configuration of a possible information processing apparatus in which the image processing device and the image processing method according to the embodiments of the invention can be embodied.

In FIG. 15, a Central Processing Unit (CPU) 1501 performs various processes according to program stored in a Read Only Memory (ROM) 1502 or program loaded from a storage portion 1508 into a Random Access Memory (RAM) 1503 in which data required when the CPU 1501 performs the various processes, etc., is also stored as needed. The CPU 1501, the ROM 1502 and the RAM 1503 are connected to each other via a bus 1504. An input/output interface 1505 is also connected to the bus 1504.

The following components are connected to the input/output interface 1505: an input portion 1506 (including a keyboard, a mouse, etc.); an output portion 1507 (including a display, e.g., a Cathode Ray Tube (CRT), a Liquid Crystal Display (LCD), etc. and a speaker, etc.); a storage port 1508 (including a hard disk, etc.); and a communication portion 1509 (including a network interface card, e.g., an LAN card, a modem, etc). The communication portion 1509 performs a communication process over a network, e.g., the Internet. A driver 1510 is also connected to the input/output interface 1505 as needed. A removable medium 1511, e.g., a magnetic disk, an optical disk, an optic-magnetic disk, a semiconductor memory, etc., can be installed on the driver 1510 as needed so that computer program read therefrom can be installed into the storage portion 1508 as needed.

In the case that the foregoing series of processes are performed in software, program constituting the software can be installed from a network (e.g., the Internet) or a storage medium (e.g., the removable medium 1511).

Those skilled in the art should understand that this storage medium is not limited to the removable medium 1511 in which programs are stored and which is distributed separately from the device so as to provide programs to the user as shown in FIG. 15. Examples of the removable medium 1511 include the magnetic disk (including floppy disk (registered trade mark)), the optical disk (including compact disk-read only memory (CD-ROM) and digital versatile disk (DVD)), the magneto optical disk (including mini disk (MD) (registered trade mark)) and the semiconductor memory. Alternatively, the storage medium may be the ROM 1502, the hard disk contained in the storage portion 1508 or the like, in which programs are stored and which are distributed to the user together with the device containing them.

Furthermore the invention further proposes a product program on which machine readable instruction codes are stored. The instruction codes upon being read and executed by a machine can perform the image processing method according to the embodiments of the invention. Correspondingly various storage mediums on which such a program product is carried, e.g., a magnetic disk, an optical disk, an optic-magnetic disk, a semiconductor memory, etc., will also be encompassed in the disclosure of the invention.

In the foregoing description of the embodiments of the invention, a feature described and/or illustrated with respect to an implementation can be used identically or similarly in one or more other implementations in combination with or in place of a feature in the other implementation(s).

It shall be emphasized that the term "including/comprising" as used in this context indicates the presence of a feature, an element, a step or a component but does not preclude the presence or addition of one or more other features, elements, steps or components. Such ordinal terms as "first", "second", etc., do not indicate an order in which features, elements, steps or components defined by these terms are implemented or their degrees of importance but are merely intended to distinguish these features, elements, steps or components from each other for the sake of clarity.

Furthermore the method according to the respective embodiments of the invention will not necessarily be performed in a sequential order described in the specification or illustrated in the drawings but can alternatively be performed in another sequential order concurrently or separately. Therefore the technical scope of the invention will not be limited by the order in which the method is performed as described in the specification.

Furthermore apparently the respective operation processes of the method according to the invention described above can also be embodied in computer executable program stored in various machine readable storage mediums.

Moreover the object of the invention can also be attained as follows: the storage medium in which the foregoing executable program codes can be stored is provided directly or indirectly to a system or an apparatus and a computer or a Central Processing Unit (CPU) in the system or the apparatus reads and executes the foregoing program codes.

At this time an implementation of the invention will not be limited to the program as long as the system or the apparatus has the function of executing the program, and the program can also be embodied in any form, e.g., object program, program executed by an interpreter, script program provided to an operating system, etc.

These mechanize readable storage mediums listed above include but will not be limited to various memories and storage units, semiconductor apparatus, magnetic disk units, e.g., optical, magnetic and optic-magnetic disks, other mediums suitable for storing information, etc.

Furthermore the invention can also be embodied by a client computer being connected to a corresponding website over the Internet and downloading and installing thereon the computer program codes according to the invention and then executing the program.

Finally it shall be further noted that such relationship terms in this context as left and right, first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or an apparatus including a series of elements includes both those elements and other elements which are not listed explicitly or elements inherent to the process, the method, the article or the apparatus. Unless further stated otherwise, an element being defined in the sentence "include/comprise a(n) . . . " will not exclude the presence of additional identical element in the process, the method, the article or the apparatus including the element.

In summary the invention provides the following solutions in the embodiments of the invention:

Annex 1. An image processing device, including: an extracting unit configured to extract boundaries of a document in a first direction and roughly-detected document corners of the document in a document image captured for the document; a determining unit configured to determine candidate page corners of the document on the boundaries of the document in the first direction around the roughly-detected document corners; and a selecting unit configured to select the candidate page corners with the closest intra-page area pixel feature to a page corner pixel feature of the document among the candidate page corners as document corners of the document, wherein the first direction is a horizontal direction or a vertical direction of the document image.

Annex 2. The image processing device according to annex 1, wherein the extracting unit includes: a first processing sub-unit configured to obtain a foreground area of the document image in a global binarization method to obtain edges of the foreground area and to determine intersections between the adjacent edges of the foreground area as the roughly-detected document corners of the document; and a second processing sub-unit configured to detect boundaries between the roughly-detected document corners of the document in the first direction in a dynamic programming method as the boundaries of the document in the first direction.

Annex 3. The image processing device according to annex 1 or 2, wherein the determining unit includes: a cropping sub-unit configured to crop for each roughly-detected document corner a boundary segment including the roughly-detected document corner on the boundary of the document in the first direction and to crop an image block including the boundary segment in the document image; a first calculating sub-unit configured to obtain a binarized gradient image of the image block by calculating a gradient of the image block in the first direction and using a threshold method and to obtain the slope of a boundary of the document in a second direction in a minimum entropy method, wherein the second direction is the vertical direction of the document image in the case that the first direction is the horizontal direction of the document image, and the second direction is the horizontal direction of the document image in the case that the first direction is the vertical direction of the document image; a first determining sub-unit configured to determine around each point on the boundary segment a first rectangular area related to the point, wherein the first rectangular area is of a first preset size, included in the image block and of a length extending in a direction consistent with the slope of the boundary of the document in the second direction; and a calculating and selecting sub-unit configured to calculate the numbers of foreground pixels included in the respective first rectangular areas according to the binarized gradient image of the image block and to select points satisfying the following condition on the boundary segment as the candidate page corners of the roughly-detected document corner: the numbers of foreground pixels included in the first rectangular areas corresponding to the points are above a first preset threshold.

Annex 4. The image processing device according to annex 3, wherein in the case that the extracting unit includes the first processing sub-unit and the first processing sub-unit has obtained the foreground area of the document image, the first rectangular area corresponding to each point on the boundary segment is located in the foreground area of the document image.

Annex 5. The image processing device according to annex 3 or 4, wherein the selecting unit includes: a second determining sub-unit configured, for each roughly-detected document corner, to determine around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner; a second calculating sub-unit configured to calculate the percent of foreground pixels in the intra-page area corresponding to each candidate page corner of each roughly-detected document corner; and a selecting sub-unit configured to select, the candidate page corner with the closest percent of foreground pixels in the corresponding intra-page area to the percent of foreground pixels in a page corner area of the document, among the candidate page corners of each roughly-detected document corner, as a document corner of the document.

Annex 6. The image processing device according to annex 3 or 4, wherein the selecting unit includes:

a second determining sub-unit configured, for each roughly-detected document corner, to determine around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner;

a second calculating sub-unit configured to calculate the percent of foreground pixels in the intra-page area corresponding to each candidate page corner of each roughly-detected document corner; and a filtering sub-unit configured to filter the candidate page corners according to a calculation result of the second calculating sub-unit, wherein the filtering sub-unit includes:

a pairing module configured:
  to obtain a plurality of first pairs of candidate corners by pairing between the candidate page corners of the roughly-detected document corners on the upper left and the candidate page corners of the roughly-detected document corners on the lower left among the roughly-detected document corners, and to obtain a plurality of second pairs of candidate corners by pairing between the candidate page corners of the roughly-detected document corners on the upper right and the candidate page corners of the roughly-detected document corners on the lower right among the roughly-detected document corners, in the case that the first direction is the horizontal direction of the document image, and
  to obtain a plurality of third pairs of candidate corners by pairing between the candidate page corners of the roughly-detected document corners on the upper left and the candidate page corners of the roughly-detected document corners on the upper right among the roughly-detected document corners, and to obtain a plurality of fourth pairs of candidate corners by pairing between the candidate page corners of the roughly-detected document corners on the lower left and the candidate page corners of the roughly-detected document corners on the lower right among the roughly-detected document corners, in the case that the first direction is the vertical direction of the document image;

a calculating module configured to calculate the slope of a connecting line between the two candidate page corners included in each pair of candidate page corners among the plurality of first and second pairs of candidate page corners or the plurality of third and fourth pairs of candidate page corners;

a filtering module configured to filter out the pairs of candidate page corners with the differences between the corresponding slopes and the slope of the boundary of the document in the second direction being above a second preset threshold among the plurality of first and second pairs of candidate page corners or the plurality of third and fourth pairs of candidate page corners obtained by the pairing module and to provide a selecting sub-unit with the remaining pairs of candidate page corners for processing; and the selecting sub-unit configured:
  to calculate the sum of the percents of foreground pixels in intra-page areas corresponding respectively to the two candidate page corners in each pair of candidate page corners among the remaining pairs of candidate page corners, and
  to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of first pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of second pairs of candidate page corners in the case that the first direction is the horizontal direction of the document image, and to determine the candidate page corners in the pairs of candidate page corners selected respectively among the first pairs of candidate page corners and among the second pairs of candidate page corners as document corners of the document, and
  to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of third pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of fourth pairs of candidate page corners in the case that the first direction is the vertical direction of the document image, and to determine the candidate page corners in the pairs of candidate page corners selected respectively among the third pairs of candidate page corners and among the fourth pairs of candidate page corners as document corners of the document.

Annex 7. The image processing device according to annex 5 or 6, wherein the intra-page area is a rectangular or square area with the candidate page corners corresponding to the intra-page area being as vertices, and an edge of the intra-page area runs in the direction consistent with the slope of the boundary in the second direction.

Annex 8. An image processing method, including: extracting boundaries of a document in a first direction and roughly-detected document corners of the document in a document image captured for the document; determining candidate page corners of the document on the boundaries of the document in the first direction around the roughly-detected document corners; and selecting the candidate page corners with the closest intra-page area pixel feature to a page corner pixel feature of the document among the candidate page corners as document corners of the document, wherein the first direction is a horizontal direction or a vertical direction of the document image.

Annex 9. The image processing method according to annex 8, wherein the extracting boundaries of a document in a first direction in a document image captured for the document includes: obtaining a foreground area of the document image in a global binarization method to obtain edges of the foreground area; determining intersections between the adjacent edges of the foreground area as the roughly-detected document corners of the document; and detecting boundaries between the roughly-detected document corners of the document in the first direction in a dynamic programming method as the boundaries of the document in the first direction.

Annex 10. The image processing method according to annex 9, wherein the determining candidate page corners of the document on the boundaries of the document in the first direction includes:

for each roughly-detected document corner,
cropping a boundary segment including the roughly-detected document corner on the extracted boundary of the document in the first direction and selecting an image block including the boundary segment in the document image;
obtaining a binarized gradient image of the image block by calculating a gradient of the image block in the first direction and using a threshold method, and obtaining the slope of a boundary of the document in a second direction in a minimum entropy method, wherein the second direction is the vertical direction of the document image in the case that the first direction is the horizontal direction of the document image, and the second direction is the horizontal direction of the document image in the case that the first direction is the vertical direction of the document image;
determining around each point on the boundary segment a first rectangular area related to the point, wherein the first rectangular area is of a first preset size, included in the image block and of a length extending in a direction consistent with the slope of the boundary of the document in the second direction;
calculating the numbers of foreground pixels included in the respective first rectangular areas according to the binarized gradient image of the image block; and
selecting points satisfying the following condition on the boundary segment as the candidate page corners of the roughly-detected document corner: the numbers of foreground pixels included in the first rectangular areas corresponding to the points are above a first preset threshold.

Annex 11. The image processing method according to annex 10, wherein in the case that the foreground area of the document image has been acquired, the first rectangular area corresponding to each point on the boundary segment is located in the foreground area of the document image.

Annex 12. The image processing method according to annex 10 or 11, wherein the selecting the candidate page corners with the closest intra-page area pixel feature to a page corner pixel feature of the document among the candidate page corners as document corners of the document includes:

for each roughly-detected document corner,
determining around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner; and
calculating the percent of foreground pixels in the intra-page area corresponding to each candidate page corner of the roughly-detected document corner; and
determining, the candidate page corner with the closest percent of foreground pixels in the corresponding intra-page area to the percent of foreground pixels in a page corner area of the document, among the candidate page corners of each roughly-detected document corner, as a document corner of the document.

Annex 13. The image processing method according to annex 10 or 11, wherein the selecting the candidate page corners with the closest intra-page area pixel feature to a page corner pixel feature of the document among the candidate page corners as document corners of the document includes:

for each roughly-detected document corner,
determining around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner, and calculating the percent of foreground pixels in the intra-page area corresponding to each candidate page corner of the roughly-detected document corner;
obtaining a plurality of first pairs of candidate corners by pairing between the candidate page corners of the roughly-detected document corners on the upper left and the candidate page corners of the roughly-detected document corners on the lower left among the roughly-detected document corners, and obtaining a plurality of second pairs of candidate corners by pairing between the candidate page corners of the roughly-detected document corners on the upper right and the candidate page corners of the roughly-detected document corners on the lower right among the roughly-detected document corners, in the case that the first direction is the horizontal direction of the document image, and
obtaining a plurality of third pairs of candidate corners by pairing between the candidate page corners of the roughly-detected document corners on the upper left and the candidate page corners of the roughly-detected document corners on the upper right among the roughly-detected document corners, and obtaining a plurality of fourth pairs of candidate corners by pairing between the candidate page corners of the roughly-detected document corners on the lower left and the candidate page corners of the roughly-detected document corners on the lower right among the roughly-detected document corners, in the case that the first direction is the vertical direction of the document image;
calculating the slope of a connecting line between the two candidate page corners included in each pair of candidate page corners among the plurality of first and second pairs of candidate page corners or the plurality of third and fourth pairs of candidate page corners;
filtering out such pairs of candidate page corners among the obtained first and second pairs of candidate page corners or third and fourth pairs of candidate page corners: the differences between the slopes of the connecting lines between the two candidate page corners included in the pairs of candidate page corners and the slope of the boundary of the document in the second direction are above a second preset threshold; and
calculating the sum of the percents of foreground pixels in intra-page areas corresponding respectively to the two candidate page corners included in each pair of candidate page corners among the filtered first and second pairs of candidate page corners or third and fourth pairs of candidate page corners, and
selecting the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of first pairs of candidate page corners and selecting the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of second pairs of candidate page corners in the case that the first direction is the horizontal direction of the document image, and determining the candidate page corners in the pairs of candidate page corners selected respectively among the first pairs of candidate page corners and among the second pairs of candidate page corners as document corners of the document, and selecting the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of third pairs of candidate page corners and selecting the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of fourth pairs of candidate page corners in the case that the first direction is the vertical direction of the document image, and determining the candidate page corners in the pairs of candidate page corners selected respectively among the third pairs of candidate page corners and among the fourth pairs of candidate page corners as document corners of the document.

Annex 14. The image processing method according to annex 11 or 12, wherein the intra-page area is a rectangular or square area with the candidate page corners corresponding to the intra-page area being as vertices, and an edge of the intra-page area runs in the direction consistent with the slope of the boundary in the second direction.

Annex 15. An apparatus with an image processing function, including the image processing device according to any one of annexes 1 to 7.

Annex 16. The apparatus with an image processing function according to annex 15, wherein the apparatus with an image processing function is any one of a document correction apparatus, a scanner, a camera, a video camera, a mobile phone, a computer and a personal digital assistant.

Annex 17. A computer readable storage medium, including computer program stored on, executable by a computing apparatus, wherein the program upon being executed can cause the computing apparatus to perform the image processing method according to any one of annexes 11 to 20.

The invention claimed is:

1. An image processing device, comprising a processor, wherein the processor comprises:

an extracting unit configured to extract boundaries of a document in a first direction and roughly-detected document corners of the document in a document image captured for the document;

a determining unit configured to determine candidate page corners of the document on the boundaries of the document in the first direction around the roughly-detected document corners; and a selecting unit configured to select the candidate page corners with the closest intra-page area pixel feature to a page corner pixel feature of the document among the candidate page corners as document corners of the document, wherein the first direction is a horizontal direction or a vertical direction of the document image, wherein the extracting unit comprises:

a first processing sub-unit configured to obtain a foreground area of the document image in a global binarization method to obtain edges of the foreground area and to determine intersections between the adjacent edges of the foreground area as the roughly-detected document corners of the document; and a second processing sub-unit configured to detect boundaries between the roughly-detected document corners of the document in the first direction in a dynamic programming method as the boundaries of the document in the first direction.

2. The image processing device according to claim 1, wherein the determining unit comprises:

a cropping sub-unit configured to crop for each roughly-detected document corner a boundary segment including the roughly-detected document corner on the boundary of the document in the first direction and to crop an image block including the boundary segment in the document image;

a first calculating sub-unit configured to obtain a binarized gradient image of the image block by calculating a gradient of the image block in the first direction and using a threshold method and to obtain the slope of a boundary of the document in a second direction in a minimum entropy method, wherein the second direction is the vertical direction of the document image in the case that the first direction is the horizontal direction of the document image, and the second direction is the horizontal direction of the document image in the case that the first direction is the vertical direction of the document image;

a first determining sub-unit configured to determine around each point on the boundary segment a first rectangular area related to the point, wherein the first rectangular area is of a first preset size, included in the image block and of a length extending in a direction consistent with the slope of the boundary of the document in the second direction; and a calculating and selecting sub-unit configured to calculate the numbers of foreground pixels included in the respective first rectangular areas according to the binarized gradient image of the image block and to select points satisfying the following condition on the boundary segment as the candidate page corners of the roughly-detected document corner: the numbers of foreground pixels included in the first rectangular areas corresponding to the points are above a first preset threshold.

3. The image processing device according to claim 2, wherein in the case that the extracting unit comprises the first processing sub-unit and the first processing sub-unit has obtained the foreground area of the document image, the first rectangular area corresponding to each point on the boundary segment is located in the foreground area of the document image.

4. The image processing device according to claim 2, wherein the selecting unit comprises:

a second determining sub-unit configured, for each roughly-detected document corner, to determine around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner;

a second calculating sub-unit configured to calculate the percent of foreground pixels in the intra-page area corresponding to each candidate page corner of each roughly-detected document corner; and a selecting sub-unit configured to select, the candidate page corner with the closest percent of foreground pixels in the corresponding intra-page area to the percent of foreground pixels in a page corner area of the document, among the candidate page corners of each roughly-detected document corner, as a document corner of the document.

5. The image processing device according to claim 2, wherein the selecting unit comprises:

a second determining sub-unit configured, for each roughly-detected document corner, to determine around each candidate page corner of the roughly-detected document corner an intra-page area related to the candidate page corner, wherein the intra-page area is of a second preset size and included in the image block, and the intra-page area corresponding to each candidate page corner is closer to the center of the document image than the first rectangular area corresponding to the candidate page corner;

a second calculating sub-unit configured to calculate the percent of foreground pixels in the intra-page area corresponding to each candidate page corner of each roughly-detected document corner; and a filtering sub-unit configured to filter the candidate page corners according to a calculation result of the second calculating sub-unit, wherein the filtering sub-unit comprises:

a pairing module configured:

to obtain a plurality of first pairs of candidate corners by pairing between the candidate page corners of the roughly-detected document corners on the upper left and the candidate page corners of the roughly-detected document corners on the lower left among the roughly-detected document corners, and to obtain a plurality of second pairs of candidate corners by pairing between the candidate page corners of the roughly-detected document corners on the upper right and the candidate page corners of the roughly-detected document corners on the lower right among the roughly-detected document corners, in the case that the first direction is the horizontal direction of the document image, and to obtain a plurality of third pairs of candidate corners by pairing between the candidate page corners of the roughly-detected document corners on the upper left and the candidate page corners of the roughly-detected document corners on the upper right among the roughly-detected document corners, and to obtain a plurality of fourth pairs of candidate corners by pairing between the candidate page corners of the roughly-detected document corners on the lower left and the candidate page corners of the roughly-detected document corners on the lower right among the roughly-detected document corners, in the case that the first direction is the vertical direction of the document image;

a calculating module configured to calculate the slope of a connecting line between the two candidate page corners included in each pair of candidate page corners among the plurality of first and second pairs of candidate page corners or the plurality of third and fourth pairs of candidate page corners;

a filtering module configured to filter out the pairs of candidate page corners with the differences between the corresponding slopes and the slope of the boundary of the document in the second direction being above a second preset threshold among the plurality of first and second pairs of candidate page corners or the plurality of third and fourth pairs of candidate page corners obtained by the pairing module and to provide a selecting sub-unit with the remaining pairs of candidate page corners for processing; and the selecting sub-unit configured:

to calculate the sum of the percents of foreground pixels in intra-page areas corresponding respectively to the two candidate page corners in each pair of candidate page corners among the remaining pairs of candidate page corners, and to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of first pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of second pairs of candidate page corners in the case that the first direction is the horizontal direction of the document image, and to determine the candidate page corners in the pairs of candidate page corners selected respectively among the first pairs of candidate page corners and among the second pairs of candidate page corners as document corners of the document, and to select the pair of candidate page corners with the closest sum, of the percents of foreground pixels in the intra-page areas corresponding respectively to the two candidate page corners included in the pair of candidate page corners, to the percent of foreground pixels in a page corner area of the document among the plurality of third pairs of candidate page corners and select the pair of candidate page corners with the closest sum, of the percents of foreground pixels in the intra-page areas corresponding respectively to the two candidate page corners included in the pair of candidate page corners, to the percent of foreground pixels in the page corner area of the document among the plurality of fourth pairs of candidate page corners in the case that the first direction is the vertical direction of the document image, and to determine the candidate page corners in the pairs of candidate page corners selected respectively among the third pairs of candidate page corners and among the fourth pairs of candidate page corners as document corners of the document.

6. The image processing device according to claim 4, wherein:

the intra-page area is a rectangular or square area with the candidate page corners corresponding to the intra-page area being as vertices, and an edge of the intra-page area runs in the direction consistent with the slope of the boundary in the second direction.

7. An image processing method, comprising:

extracting boundaries of a document in a first direction and roughly-detected document corners of the document in a document image captured for the document;

determining candidate page corners of the document on the boundaries of the document in the first direction around the roughly-detected document corners; and selecting candidate page corners with the closest intra-page area pixel feature to a page corner pixel feature of the document among the candidate page corners as the document corners of the document, wherein the first direction is a horizontal direction or a vertical direction of the document image, wherein the extracting step comprises:

obtaining a foreground area of the document image in a global binarization method to obtain edges of the foreground area and determining intersections between the adjacent edges of the foreground area as the roughly-detected document corners of the document; and detecting boundaries between the roughly-detected document corners of the document in the first direction in a dynamic programming method as the boundaries of the document in the first direction.

8. An apparatus with an image processing function, comprising an image processing device, wherein the image processing device comprises a processor, wherein the processor comprises:

an extracting unit configured to extract boundaries of a document in a first direction and roughly-detected document corners of the document in a document image captured for the document;

a determining unit configured to determine candidate page corners of the document on the boundaries of the document in the first direction around the roughly-detected document corners; and a selecting unit configured to select the candidate page corners with the closest intra-page area pixel feature to a page corner pixel feature of the document among the candidate page corners as document corners of the document, wherein the first direction is a horizontal direction or a vertical direction of the document image, wherein the extracting unit comprises:

a first processing sub-unit configured to obtain a foreground area of the document image in a global binarization method to obtain edges of the foreground area and to determine intersections between the adjacent edges of the foreground area as the roughly-detected document corners of the document; and a second processing sub-unit configured to detect boundaries between the roughly-detected document corners of the document in the first direction in a dynamic programming method as the boundaries of the document in the first direction.

9. The apparatus with an image processing function according to claim 8, wherein the apparatus with an image processing function is any one of a document correction apparatus, a scanner, a camera, a mobile phone, a computer and a personal digital assistant.

* * * * *